July 27, 1943.   D. L. WEST   2,325,350
VISUAL COLOR COMPARATOR
Filed Oct. 29, 1940   3 Sheets-Sheet 1

INVENTOR
D. L. WEST
BY Fetherstonhaugh & Co.
ATTORNEYS

July 27, 1943.   D. L. WEST   2,325,350
VISUAL COLOR COMPARATOR
Filed Oct. 29, 1940   3 Sheets-Sheet 2

INVENTOR
D. L. WEST
BY Fetherstonhaugh & Co.
ATTORNEYS

July 27, 1943.  D. L. WEST  2,325,350
VISUAL COLOR COMPARATOR
Filed Oct. 29, 1940  3 Sheets-Sheet 3
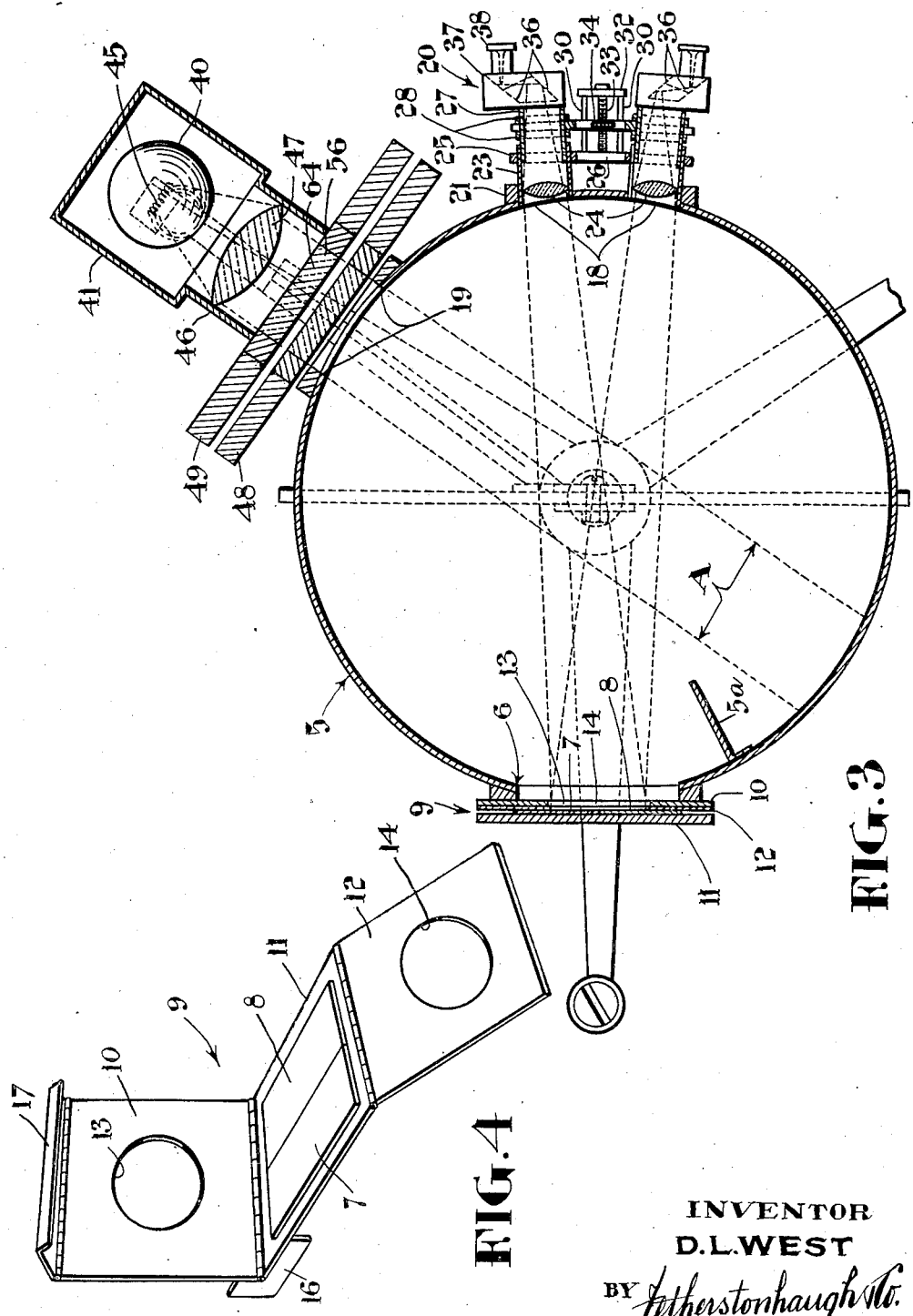
INVENTOR
D. L. WEST
BY *Fetherstonhaugh & Co.*
ATTORNEYS Patented July 27, 1943

2,325,350

UNITED STATES PATENT OFFICE 2,325,350

VISUAL COLOR COMPARATOR

Douglas L. West, Montreal, Quebec, Canada, assignor to Howard Smith Paper Mills Limited, Montreal, Quebec, Canada Application October 29, 1940, Serial No. 363,327

4 Claims. (Cl. 88—14)

This invention relates to improvements in visual color comparators. Such instruments are frequently used for comparing the color of a sample with that of a standard of known color quality.

The main object of the present invention is to provide a generally improved visual color comparator in which provision is made for eliminating the introduction of errors due to variations in the finish, texture, or contour of the light reflecting surfaces of the specimens under test.

Another object is to provide a color comparator designed so that the color characteristics of the light by which the samples under test are observed may be changed at will to approximate the color qualities of the varying light sources under which the samples are likely to be reexamined under ordinary market conditions.

A further object is to provide a visual color comparator designed so that any visual color difference or mis-match which is found to exist between the sample and standard specimens when examined under widely different qualities of light may be analyzed by reexamination of the specimens with suitable trichromatic filters arranged in front of the light source.

Another object is to provide a visual color comparator which is simple and inexpensive in construction and may be used effectively by operators who are not skilled in or conversant with color technology.

In its preferred embodiment the instrument described herein comprises a light integrating sphere provided with an opening over which a standard and a sample of the material to be tested are held in place so that they form a part of the sphere wall. The sphere is also provided with a viewing opening and a light admission opening. The viewing opening is located directly opposite the first mentioned opening and is fitted with a binocular eye piece whose focus is adjustable and whose field of view is restricted to the area occupied by the standard and the sample under test. An artificial light source, such as a tungsten filament lamp, is arranged to project a concentrated beam of light through the light admission opening and across the sphere toward an opposite portion of the sphere wall which is located intermediate the first mentioned opening and the viewing opening. A shield or mask is arranged in the sphere adjacent to the point where the beam of light strikes the sphere wall and serves to prevent any directly reflected light from being thrown onto the standard and the sample which are being observed through the eye piece. The light is thus forced to undergo multiple internal reflection within the sphere and is thoroughly diffused before it reaches the standard and the sample.

It may be noted here that, with such a geometry of illumination, variations in the absorption of light by the specimens under observation or in the intensity of light reflected by such specimens will, insofar as such variations are due solely to variations in the finish, contour, or texture of the reflecting surfaces of the specimens, be entirely eliminated as error introducing factors in the visual comparison of the color qualities of the specimens.

The source of illumination is preferably a projection lamp which operates at a very high temperature and is contained in a lamp housing arranged exteriorly of and opposite the light admission opening of the sphere. A condenser lens and suitable color filters are interposed between the lamp and the light admission opening so that the light which passes through the lens and the filters emerges as a filtered, parallel, collimated beam which is projected across the sphere and falls on a portion of the sphere wall located intermediate the sample and eye piece openings.

In order to minimize or eliminate introduction of errors due to variations in the spectral quality of the light produced by the lamp, it is desirable that the current supplied to the lamp filament be maintained at a constant value. This may be accomplished by providing a suitable rheostat and ammeter control in the lamp circuit or by connecting the lamp across the secondary of a constant current transformer of the type disclosed in my co-pending application Serial No. 399,364 filed June 23, 1941.

From the standpoint of visual color examination the color quality of the light by which the standard and the sample are examined is of considerable importance. Specimens which appear to be of the same color quality when examined under one light source will frequently exhibit a visual color difference or mis-match when reexamined under another light source of different spectral quality. Consequently, in order to make sure that a true color match has been obtained between any two specimens, it is necessary to examine them under widely different qualities of light approximating the color qualities of the varying light sources under which they are likely to be reexamined under ordinary market conditions.

The instrument described herein is designed so that the color characteristics of the light by which the specimens under test are compared may be changed at will by placing various color filters in front of the lamp used as the source of illumination. The exact type of color filters employed depends entirely on the type of light required. For general observation, as in color matching between samples and standards, the extremes of color of light to which the samples are successively exposed under test range between the color of North sky daylight and the color of the light produced by a tungsten filament lamp. In practice this may be accomplished by subjecting the specimens to three successive examinations with a different type of color filter arranged in front of the light source for each observation. One filter should be of a type which yields light of a color approximating the color of North sky daylight. The second filter should be of the type which yields light of a color approximating the color of noon sunlight and the third should be of the type which yields light approximating the color of the light produced by a tungsten filament lamp. Specimens which appear to be of the same color when successively examined under these types of light will rarely exhibit any visual color difference or mis-match when illuminated by any other light source under which they are likely to be examined under market conditions.

Another advantage of the instrument described herein is that it may be employed for analyzing the causes of any visual color difference or mismatch which is found to exist between specimens which have been examined and compared. When such visual color difference or mis-match is found to exist the specimens may be reexamined under separate trichromatic light by interposing red, green and blue filters between the light source and the light admission opening of the sphere. Under any one or more of these lights the color qualities of the sample and the standard can be analyzed to determine which of the three color components of red, green and blue is responsible for the mis-match.

In the further description of this invention reference will be had to the accompanying drawings, wherein—

Fig. 3 is a sectional view taken substantially along the line 3—3 of Fig. 2.

Fig. 4 is a perspective view of the specimen holder by which the sample and standard are held in place during an observation.

Figure 1:
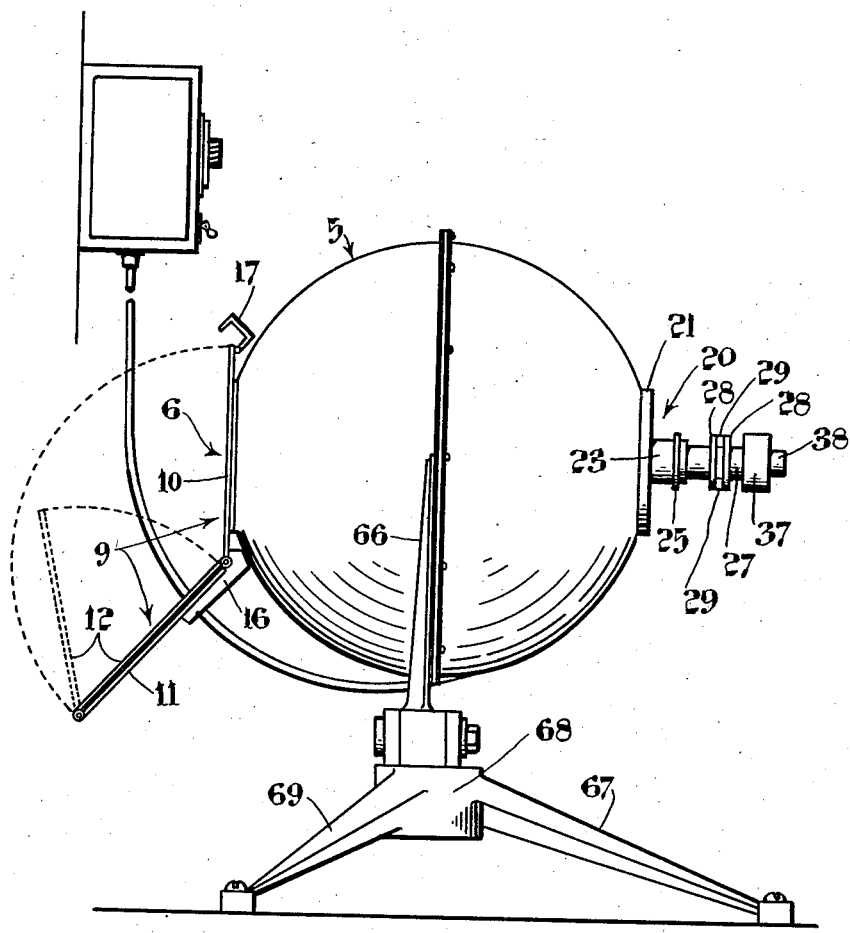
Fig. 1 is a side view of my improved color comparator.
Figure 5:
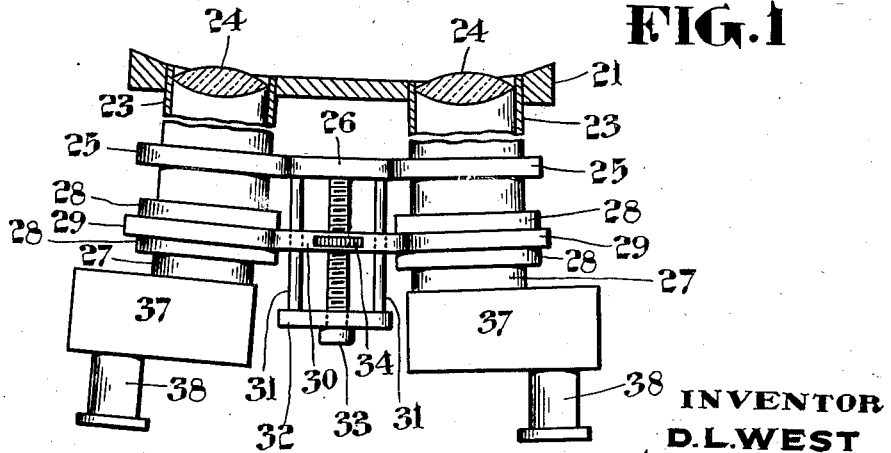
Fig. 5 is an enlarged view, partly in plan and partly in horizontal section, of an eye piece forming part of said apparatus.
Figure 2:
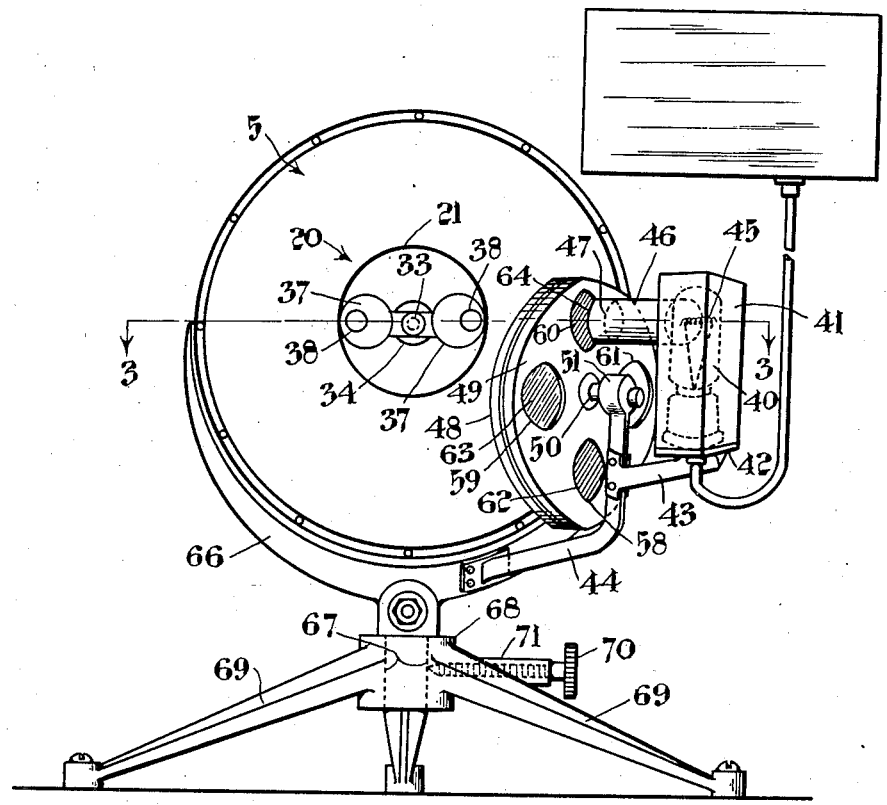
Fig. 2 is a front view.
Figures 6, 7:
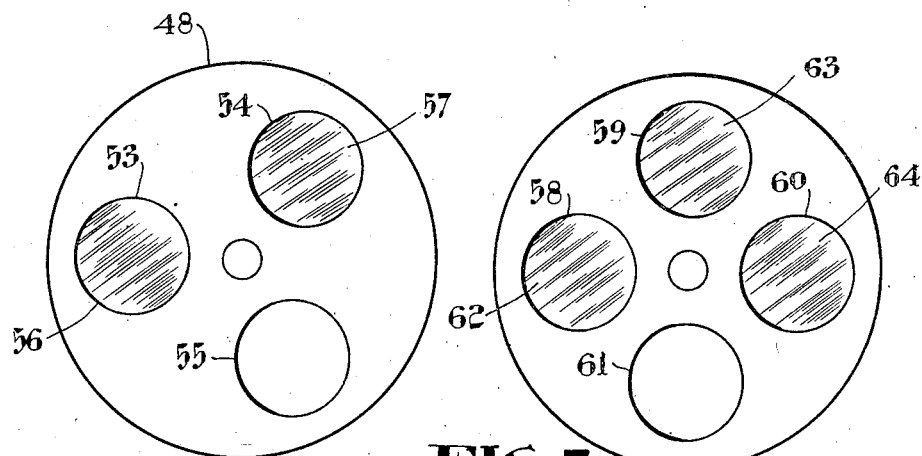
Fig. 6 is a plan view of one of two filter wheels forming part of said instrument.
Fig. 7 is a plan view of the remaining filter wheel.

Referring more particularly to the drawings, 5 designates a light-integrating sphere provided with a white, diffusely reflecting, inner surface. This sphere is provided with an opening 6 over which the standard and sample specimens to be compared are held in place so that they form a part of the sphere wall. In the present instance the sample 7 and the standard 8 are shown held in place by a specimen holder generally indicated at 9 (see Figs. 1 and 4). This holder comprises three hingedly connected plates designated 10, 11, and 12. Plate 10 is rigidly secured to the sphere 5 and is provided with an opening 13 which is aligned with the sphere opening 6. Plate 11 is a solid plate having one edge hinged to the lower edge of plate 10 and the opposite edge hinged to one edge of plate 12. The last mentioned plate is provided with an opening 14 which is somewhat smaller than the openings 6 and 13.

The loading of the specimen holder is accomplished in the following manner: Plate 11 is swung downwardly to the loading position shown in Fig. 1 and is supported in this position by suitable supporting brackets 16 attached to the lower portion of plate 10. Plate 12 is then swung from the full line position shown in Fig. 1 to the dotted line position so that the standard 7 and the sample 8 may be arranged on the upper surface of plate 11 in the side by side relationship shown in Fig. 4. Plate 12 is then swung back to the full line position so that it overlies the sample and the standard. The folded plates 11 and 12 are then swung upwardly to the position shown in Fig. 3 and are secured in this position by a latch 17 (see Fig. 1) which is hinged to the upper edge of plate 10 and is made channel-shaped so that it is adapted to fit over the upper edges of plates 11 and 12 in retaining engagement therewith. The specimens, comprising the sample 7 and the standard 8, should be arranged in the specimen holder so that an equal amount of each specimen is visible through the sphere opening 6.

The sphere 5 is also provided with two additional openings comprising a viewing opening 18 and a light admission opening 19.

The viewing opening 18 is located directly opposite the sphere opening 6 and is fitted with a binocular eye piece generally indicated at 20. As here shown the eye piece includes a plate 21 having one side curved to fit against the sphere 5. This plate is welded or otherwise secured in place over the viewing opening 18 and is provided with two apertures in which the inner ends of two tubes 23 are rigidly secured. A lens 24 is fitted in the inner end of each tube 23 and constitutes one of the object lenses of the eye piece. Circular ring clamps 25 are fixed to the tubes 23 and are connected together by a bar 26. A second pair of tubes 27 are arranged with their inner ends slidably fitted in the outer ends of the tubes 23. Each tube 27 is provided with two collars 28 spaced apart to receive between them one of a pair of forks 29 provided at opposite ends of an adjustable focusing bar 30.

Guides 31 extend outwardly from the central portion of bar 26 and are connected at their outer ends by a cross piece 32. A screw 33 is arranged between the guides 31 with the outer end of the screw supported by the cross piece 32 and the inner end of the screw attached to the bar 26. The focusing bar 30 is slidably supported by the guides 31 and is moved inwardly and outwardly by means of a knurled nut 34 in threaded engagement with the screw 33. From this description it will be evident that the focusing of the eye piece by appropriate adjustment of the telescopic tubes may be accomplished by rotating the nut 34 to slide the tubes 27 inwardly or outwardly with reference to the tubes 23.

Prisms 36 are housed in prism containers 37 carried by the outer ends of the tubes 27. Each container 37 is provided with an eye piece 38. The optical centres of these eye pieces 38 may be adjusted by rotation of the containers 37 to suit the eyes of different observers using the eye piece.

The individual telescopes of the binocular eye piece described herein are aligned with their optical axes centred with reference to the specimen opening 6 so that the field of view of the eye piece is restricted to the area occupied by the sample 7 and the standard 8.

While I have described the assembly of the binocular eye piece 20 in considerable detail it may be said that, in general, this assembly closely follows that of a pair of conventional binoculars of the prismatic type but with lenses changed for the appropriate magnification required and the shorter distance of observation.

A beam of light produced by a high temperature tungsten-filament, projection lamp 40 is projected through the light admission opening 19 and across the sphere 5 toward a portion of the sphere wall located intermediate the specimen exposing opening 6 and the viewing opening 18. Lamp 40 is located exteriorly of the sphere 5, being contained in a lamp housing 41 mounted on a table 42 which is carried by an arm 43 attached to a supporting bracket 44. The filament 45 of lamp 40 is centrally aligned with the central axis of a lens tube 46 carried by the front of the lamp housing 41. Tube 46 is aligned with the light admission opening 19 and contains a lens 47. Light from the lamp 40 enters the lens 47 and emerges therefrom as a parallel collimated beam A which, as previously stated, is projected across the sphere to a portion of the sphere wall located between the openings 6 and 18. Filter wheels 48 and 49 are arranged between the light admission opening 19 and the adjacent end of the lens tube 46. Each of these wheels is rotatably mounted on a fixed shaft 50 having one end secured in a bearing 51 provided at the upper end of the bracket 44.

The wheel 48 is provided with three openings designated 53, 54 and 55. The opening 53 is fitted with a color filter 56 of a type which yields light of a color approximating the color of north daylight. The opening 54 is fitted with a color filter 57 of a type which yields light of a color approximating the color of noon sunlight. The third opening 55 is left clear.

The filter wheel 49 is provided with four openings designated 58, 59, 60 and 61 is provided with three monochromatic filters comprising a red filter 62 fitted in the opening 58; a green filter 63 fitted in the opening 59; and a blue filter 64 fitted in opening 60. The fourth opening 61 of wheel 49 is left clear. The wheels 48 and 49 are mounted so that the openings therein may be successively interposed between the light admission opening 19 and the lens 47 by turning the wheels about the fixed shaft 50.

In the use of these filter wheels the wheel 49 is initially rotated to position the clear opening 61 in alignment with the light admission opening 19. The specimens being compared may then be successively examined under light of a color approximating north sky daylight, noon sunlight and artificial light by rotating the wheel 48 to successively position each of the openings 53, 54 and 55 of said wheel between the light source and the light admission opening 19. If any color variation or mis-match between specimens is revealed by this examination thereof in lights of different color qualities, the wheel 48 is turned to position the clear opening 55 opposite the light admission opening 19 and the wheel 49 is then turned to successively position each of the analyzing filters 62, 63 and 64 between the opening 19 and the light source. This last examination of the specimens under separate trichromatic light obtained by interposing the red, green and blue filters between the light source and the light admission opening will enable the observer to determine which of the three color components of red, green and blue are responsible for the color variation or mismatch.

The bracket arm 44 which supports the lamp housing 41 may be conveniently attached to one arm of a forked bracket 66 in which the sphere 5 is mounted. The bracket 66 is provided with a spindle 67 which is rotatably mounted in a circular boss 68 carried by three supporting legs 69. This method of mounting the sphere enables it to be turned about a vertical axis so that either the eye piece or the specimen holder may be brought within convenient reach of an operator standing in one position. The sphere is secured in any position to which it is turned by means of a set screw 70 which is threaded through a sleeve 71 carried by the boss 68 into clamping engagement with the spindle 67.

A shield or mask 5a (Fig. 3) is preferably arranged in the sphere adjacent to the point where the beam A strikes the sphere wall to prevent any directly reflected light from being thrown onto the standard and the sample which are being observed through the eye piece. As previously stated, this ensures that the light from the lamp is forced to undergo multiple internal reflection within the sphere and to be thoroughly diffused before it reaches the standard and the sample.

Having thus described what I now consider to be the preferred embodiment of this invention, it will be understood that various modifications in the construction and arrangement of the parts may be resorted to within the scope and spirit of the invention as defined by the appended claims.

Having thus described my invention, what I claim is:

1. An instrument for use in comparing, on a qualitative basis and by direct visual examination, the color characteristics of a standard and a sample, said instrument comprising a light-integrating sphere provided with oppositely disposed specimens and viewing openings and an intermediate light admission opening, an external source of light, means for projecting a concentrated beam of light from said source through said light admission opening and across the sphere toward an opposite wall portion thereof located intermediate the specimen opening and the viewing opening, means for holding a standard and a sample in side by side relation over said specimen opening so that they fall under the direct observation of an observer looking into the sphere through said viewing opening, two adjustable filter holders arranged between the light source and the light admission opening of the sphere, one of said holders being provided with a clear opening, a second opening fitted with a color filter of a type which yields light of a color approximating the color of north sky daylight, and a third opening fitted with a color filter of a type which yields light of a color approximating the color of noon sunlight, the remaining filter holder being provided with a clear opening, a second opening fitted with a red color filter, a third opening fitted with a blue color filter and a fourth opening fitted with a green color filter, and means mounting said holders so that each holder may be shifted to selectively position the opening therein between said light source and said light admission opening.

2. An instrument for use in comparing, on a qualitative basis and by direct visual examination, the color characteristics of a standard and a sample arranged in side by side relation, said instrument comprising a light-integrating sphere provided with oppositely directed specimen and viewing openings and an intermediate light admission opening, means carried by said sphere for holding a standard and a sample in side by side relation over said specimen opening, a binocular eye piece secured to said sphere over said viewing opening so that an observer looking through said eye piece is able to compare, by direct visual examiation, the color characteristics of the standard and the sample, means for projecting a concentrated beam of light through the light admission opening and across the sphere toward a portion of the sphere wall located intermediate the specimen opening and the viewing opening, and means whereby the specimens being compared may be successively examined under lights of different color to determine whether the specimens exhibit any color variation or mis-match and means whereby the specimens may be examined under separate trichromatic light to determine which color component is responsible for any color variation or mis-match revealed during the use of the first mentioned means, each of said means comprising a filter holder provided with a clear opening and a plurality of additional openings, the last mentioned openings being provided with suitable color filters, and a shaft on which the filter holders are rotatably mounted one behind the other so that said filter holders may be independently turned about said shaft to selectively position the openings therein in line with the light admission opening of said sphere, said filter holders being interposed between said light admission opening and said light source.

3. An instrument for use in comparing, on a qualitative basis and by direct visual examination, the color characteristics of a standard and a sample, said instrument comprising a light-integrating sphere provided with oppositely disposed specimen and viewing openings and an intermediate light admission opening, an external source of light, means for projecting a concentrated beam of light from said light source through said light admission opening and across the sphere toward an opposite wall portion thereof located intermediate the specimen opening and the viewing opening, means for holding a standard and a sample in side by side relation over said specimen opening so that they fall under the direct observation of an observer looking into the sphere through said viewing opening and means whereby the color characteristics of the light by which the sample and the standard are being observed by an observer looking through the viewing opening may be changed at will to approximate the color characteristics of the varying light sources under which the sample is likely to be re-examined under ordinary market conditions, said means comprising a filter holder arranged between said light source and said light admission opening and provided with a plurality of light transmitting openings adapted to be selectively aligned with said light admission opening, one of said light transmitting openings being left clear and each of the remaining light transmitting openings being fitted with a color filter adapted to yield light of a predetermined color quality differing from the color quality of the light yielded by each of the remaining color filters, said filters being selected so that the color quality of the light yielded by each approximates the color quality of one of the aforesaid light sources under which the sample is likely to be re-examined and means mounting said filter holder so that it may be shifted to selectively position each of said light transmitting openings in line with the light admission opening of said sphere.

4. An instrument for use in comparing, on a qualitative basis and by direct visual examination, the color characteristics of a standard and a sample, said instrument comprising a light-integrating sphere provided with oppositely disposed specimen and viewing openings and an intermediate light admission opening, an external source of light, means for projecting a concentrated beam of light from said light source through said light admission opening and across the sphere toward an opposite wall portion thereof located intermediate the specimen opening and the viewing opening, means for holding a standard and a sample in side by side relation over said specimen opening so that they fall under the direct observation of an observer looking into the sphere through said viewing opening and means whereby the color characteristics of the light by which the sample and the standard are being observed by an observer looking through the viewing opening may be changed at will to approximate the color characteristics of the varying light sources under which the sample is likely to be re-examined under ordinary market conditions, said means comprising a filter holder arranged between said light source and said light admission opening and provided with a plurality of light transmission openings including a clear opening, a second opening fitted with a color filter of a type which yields light of a color approximating the color of north sky daylight and a third opening fitted with a color filter of a type which yields light of a color approximating the color of noon sunlight and means mounting said filter holder so that it may be shifted to selectively position the openings therein in line with the light admission opening of said sphere.

DOUGLAS L. WEST.